United States Patent
Conti et al.

(10) Patent No.: US 11,072,220 B2
(45) Date of Patent: Jul. 27, 2021

(54) VEHICLE SUSPENSION WITH A REGENERATIVE HYDRAULIC SHOCK-ABSORBER AND WITH A SYSTEM FOR ADJUSTING THE ATTITUDE OF THE VEHICLE

(71) Applicants: SISTEMI SOSPENSIONI S.p.A., Corbetta (IT); MAGNETI MARELLI S.p.A., Corbetta (IT)

(72) Inventors: Piero Antonio Conti, Asti (IT); Giordano Greco, Turin (IT); Andrea Nepote, Turin (IT); Nicola Amati, Alpignano (IT); Renato Galluzzi, San Benigno Canavese (IT); Andrea Tonoli, Avigliana (IT)

(73) Assignees: SISTEMI SOSPENSIONI S.p.A., Corbetta (IT); MAGNETI MARELLI S.p.A., Corbetta (IT)

(*) Notice: Subject to any disclaimer, the term of this patent is extended or adjusted under 35 U.S.C. 154(b) by 414 days.

(21) Appl. No.: 16/303,518

(22) PCT Filed: May 23, 2017

(86) PCT No.: PCT/EP2017/062342
§ 371 (c)(1),
(2) Date: Nov. 20, 2018

(87) PCT Pub. No.: WO2017/202811
PCT Pub. Date: Nov. 30, 2017

(65) Prior Publication Data
US 2020/0324610 A1    Oct. 15, 2020

(30) Foreign Application Priority Data
May 24, 2016  (IT) .................. 102016000053196

(51) Int. Cl.
*B60G 17/08* (2006.01)
*B60G 13/08* (2006.01)

(52) U.S. Cl.
CPC ............ *B60G 17/08* (2013.01); *B60G 13/08* (2013.01); *B60G 2202/242* (2013.01);
(Continued)

(58) Field of Classification Search
CPC ........ B60G 17/08; B60G 13/08; B60G 15/06; B60G 2202/413; B60G 2202/416;
(Continued)

(56) References Cited

U.S. PATENT DOCUMENTS 5,295,563 A * 3/1994 Bennett .............. B60G 17/0152
188/266.2
5,342,023 A * 8/1994 Kuriki ................ B60G 17/0185
267/64.16
(Continued)

FOREIGN PATENT DOCUMENTS

| CN | 1053943 A | 8/1991 |
|---|---|---|
| CN | 104976266 A | 10/2015 |
| WO | 2008038321 A1 | 4/2008 |

OTHER PUBLICATIONS

International Search Report and Written Opinion of the International Searching Authority for PCT International Application No. PCT/EP2017/062342 dated Aug. 31, 2017.

*Primary Examiner* — James A English
*Assistant Examiner* — Caitlin Anne Miller
(74) *Attorney, Agent, or Firm* — Howard & Howard Attorneys PLLC

(57) ABSTRACT

A suspension including a spring interposed between the body (B) of the vehicle and the wheel (W); a regenerative hydraulic shock-absorbing unit comprising a hydraulic shock-absorber arranged parallel to the spring, a motor and
(Continued)

pump unit with a volumetric hydraulic machine and an electric machine coupled to the hydraulic machine), and an electronic control unit arranged to control the torque of the electric machine. A hydraulic actuator is arranged in series with the spring. A reservoir and a hydraulic circuit are connected to each other, the hydraulic shock-absorber, the hydraulic machine the hydraulic actuator and the reservoir. The hydraulic circuit includes a valve assembly for controlling the flow of a working fluid between the hydraulic shock-absorber, the hydraulic machine, the hydraulic actuator and the reservoir.

14 Claims, 7 Drawing Sheets

(52) U.S. Cl.
CPC .. *B60G 2202/413* (2013.01); *B60G 2202/416* (2013.01); *B60G 2300/60* (2013.01); *B60G 2500/114* (2013.01); *B60G 2500/30* (2013.01)

(58) Field of Classification Search
CPC ............ B60G 2202/32; B60G 2300/60; B60G 2500/30; B60G 2204/46
See application file for complete search history.

(56) References Cited

U.S. PATENT DOCUMENTS

| | | | |
|---|---|---|---|
| 8,839,920 B2* | 9/2014 | Anderson | ................ F03G 3/00 |
| | | | 188/322.21 |
| 9,586,456 B2* | 3/2017 | Reybrouck | .......... B60G 17/056 |
| 9,636,964 B2* | 5/2017 | Kuriki | .................... B60G 13/14 |
| 9,689,382 B2* | 6/2017 | Tucker | ................ B60G 11/265 |
| 9,834,059 B2* | 12/2017 | Seminara | ............. B60G 15/063 |
| 2003/0034697 A1* | 2/2003 | Goldner | ............. B60G 17/0157 |
| | | | 310/17 |
| 2010/0072760 A1 | 3/2010 | Anderson et al. | |
| 2013/0154280 A1 | 6/2013 | Tucker et al. | |
| 2015/0028551 A1 | 1/2015 | Reybrouck | |
| 2016/0059658 A1 | 3/2016 | Kuriki | |

\* cited by examiner

VEHICLE SUSPENSION WITH A REGENERATIVE HYDRAULIC SHOCK-ABSORBER AND WITH A SYSTEM FOR ADJUSTING THE ATTITUDE OF THE VEHICLE

CROSS-REFERENCE TO RELATED APPLICATIONS

The present application is a National Stage of International Patent Application No. PCT/EP2017/062342, filed on May 23, 2017, which claims priority to and all the benefits of Italian Patent Application No. 102016000053196, filed on May 24, 2016, both of which are hereby expressly incorporated herein by reference in their entirety.

BACKGROUND OF THE INVENTION

1. Field of the Invention

The present invention relates to a suspension for a vehicle wheel comprising a spring interposed between the wheel and the body of the vehicle, a vehicle attitude adjusting system for controlling the vertical position of the wheel relative to the body of the vehicle and a regenerative hydraulic shock-absorbing unit, i.e. a hydraulic shock-absorbing unit capable of converting part of the vibrational kinetic energy of the suspension into electric energy, wherein the vehicle attitude adjusting system comprises a single-effect hydraulic actuator arranged mechanically in series with the spring, and wherein the regenerative hydraulic shock-absorbing unit includes a hydraulic shock-absorber arranged in parallel with the assembly formed by the spring and the hydraulic actuator, a motor and pump unit having a volumetric hydraulic machine and an electric machine coupled to the hydraulic machine, and an electronic control unit arranged to control the torque (motor torque or load torque) of the electric machine.

According to a further aspect, the present invention relates to a method for controlling the attitude of a vehicle provided with a suspension of the above-identified type.

2. Description of the Related Art

Vehicle wheel suspensions of the above-mentioned type are known, for example, from US 2013/0154280. Such a known suspension is able to perform both the energy regeneration function and the shock-absorber dampening control function.

SUMMARY OF THE INVENTION

It is an object of the present invention to provide a suspension for a vehicle wheel that is capable of carrying out, in addition to the energy regeneration function and the shock-absorber damping control function, also the vehicle attitude active control function, by using for all these three functions a common mechanical, hydraulic, electrical and electronic hardware, thus minimizing the level of complexity of the suspension.

This and other objects are fully achieved according to the invention by a suspension for a vehicle wheel as described and claimed herein.

In summary, the invention is based on the idea of providing a suspension comprising a spring interposed between the wheel and the body of the vehicle, a single-effect hydraulic actuator arranged in series with the spring to control the vertical position of the wheel relative to the body of the vehicle, a regenerative hydraulic shock-absorbing unit including a hydraulic shock-absorber arranged in parallel with the assembly formed by the spring and the hydraulic actuator and a motor and pump unit having a volumetric hydraulic machine and an electric machine coupled with the hydraulic machine, a reservoir for a working fluid (oil), and a hydraulic circuit connecting the hydraulic actuator, the hydraulic shock-absorber, the hydraulic machine and the reservoir to each other, wherein the hydraulic circuit comprises a valve assembly for controlling the flow of the working fluid between the hydraulic actuator, the hydraulic shock-absorber, the hydraulic machine and the reservoir, so as to allow the suspension to operate under the following three main operating conditions:

hydraulic actuator in a fixed position to keep the distance between the wheel and the body of the vehicle at a constant value;

hydraulic actuator extended (raised) to increase the distance between the wheel and the body of the vehicle; and hydraulic actuator compressed (lowered) to reduce the distance between the wheel and the body of the vehicle.

BRIEF DESCRIPTION OF THE DRAWINGS

The features and advantages of the present invention will become more apparent from the detailed description that follows, given purely by way of non-limiting example with reference to the accompanying drawings, in which.

DETAILED DESCRIPTION OF THE INVENTION

Figure 1:
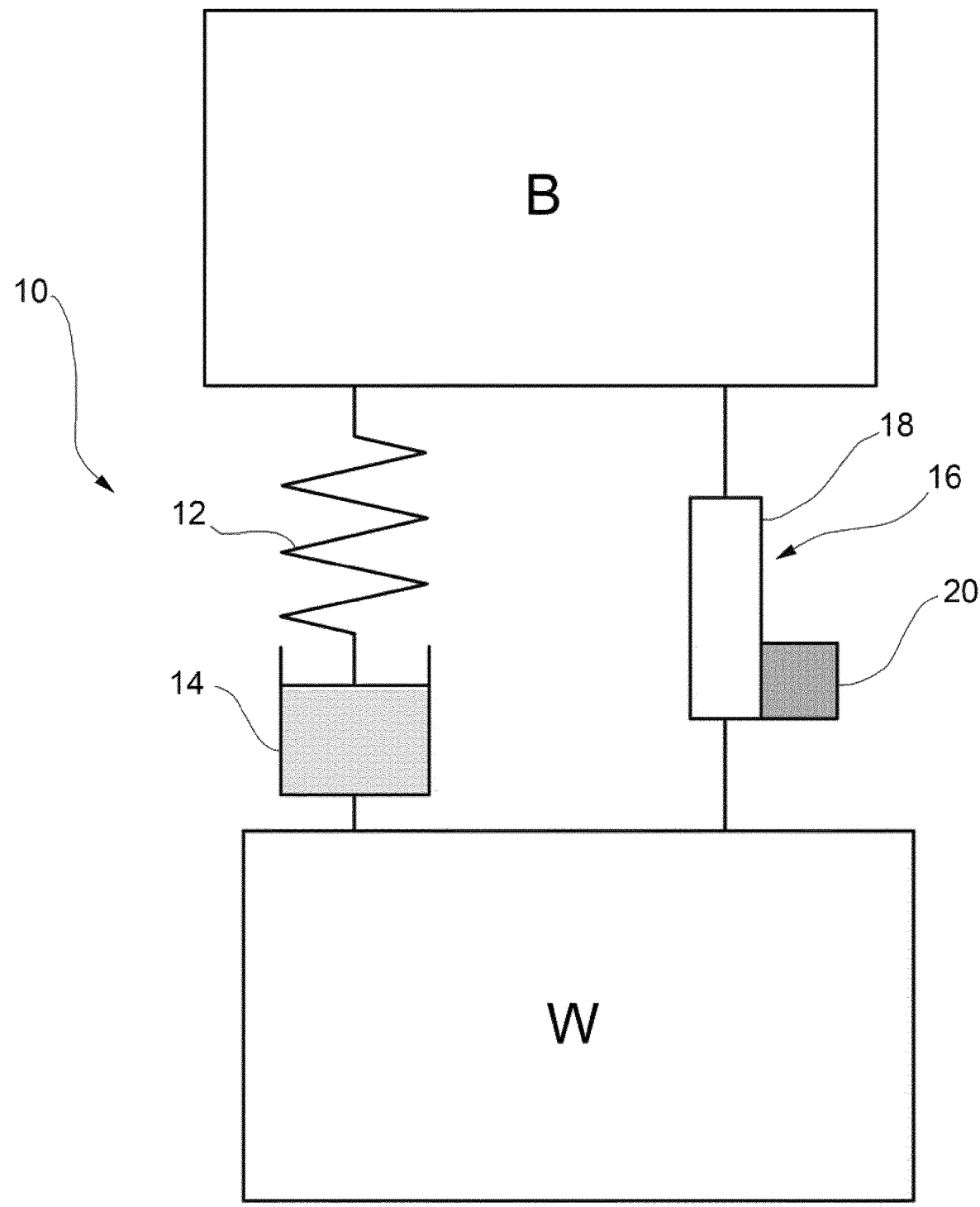
FIG. 1 is a schematic representation of the architecture of a vehicle wheel suspension according to the present invention.

With reference first to FIG. 1, a vehicle wheel suspension is generally indicated at 10 and basically comprises:

a spring 12 (preferably but not necessarily a mechanical spring) interposed between the body of the vehicle (indicated B), or more generally the suspended mass of the vehicle, and the vehicle wheel (indicated W), or more generally the non-suspended mass of the vehicle; a single-effect hydraulic actuator 14 (hereinafter referred to more simply as actuator) arranged in series with the spring 12 to control the vertical position of the wheel W relative to the body B of the vehicle; and a regenerative hydraulic shock absorbing unit 16 (hereinafter referred to simply as shock absorbing unit), i.e. a hydraulic shock-absorbing unit capable of converting part of the vibrational kinetic energy of the suspension into electrical energy, which is arranged in parallel with the assembly formed by the spring 12 and the actuator 14 and basically comprises a hydraulic shock-absorber 18 (hereinafter referred to more simply as shock-absorber) and a motor and pump unit 20.

In the embodiments of the invention proposed herein, the spring 12 is a compression and traction spring, and more precisely a cylindrical helical spring, and the actuator 14 associated with it is a linear actuator. According to these embodiments, the spring 12 rests at its opposite upper and lower ends against respective spring plates (not shown), and the actuator 14 is arranged, in a manner known per se, to vary the vertical position of one of the spring plates. Alternatively, it is however possible to provide for the use of a spring operating by torsion, in which case the actuator associated with it is a rotary actuator rather than a linear actuator.

Figure 2:
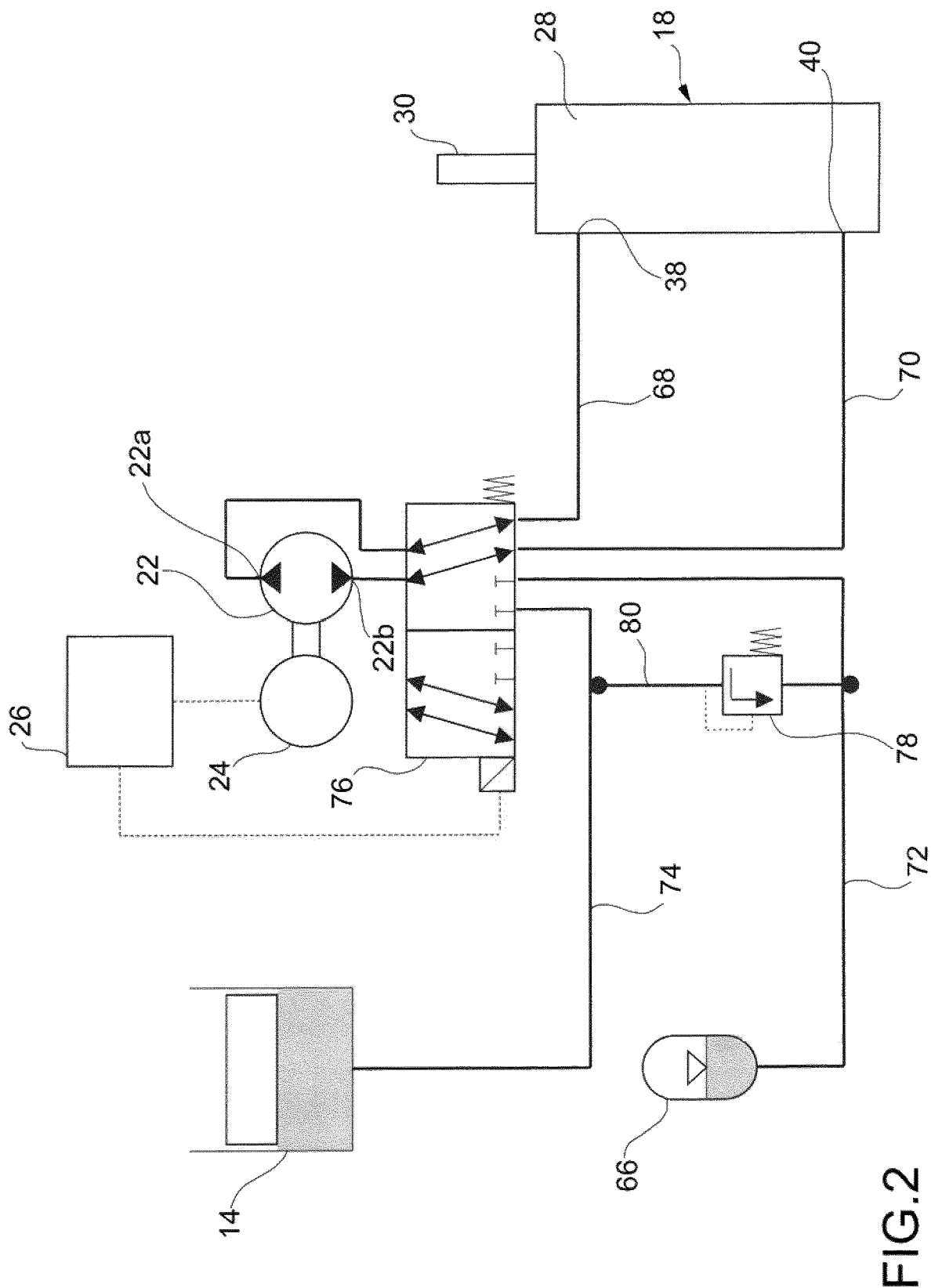
FIG. 2 is a diagram of an embodiment of a hydraulic circuit for a vehicle wheel suspension according to the present invention in a first operating mode in which the hydraulic actuator is kept in the same position to keep the distance between the wheel and body of the vehicle at a constant value.
Figure 3:
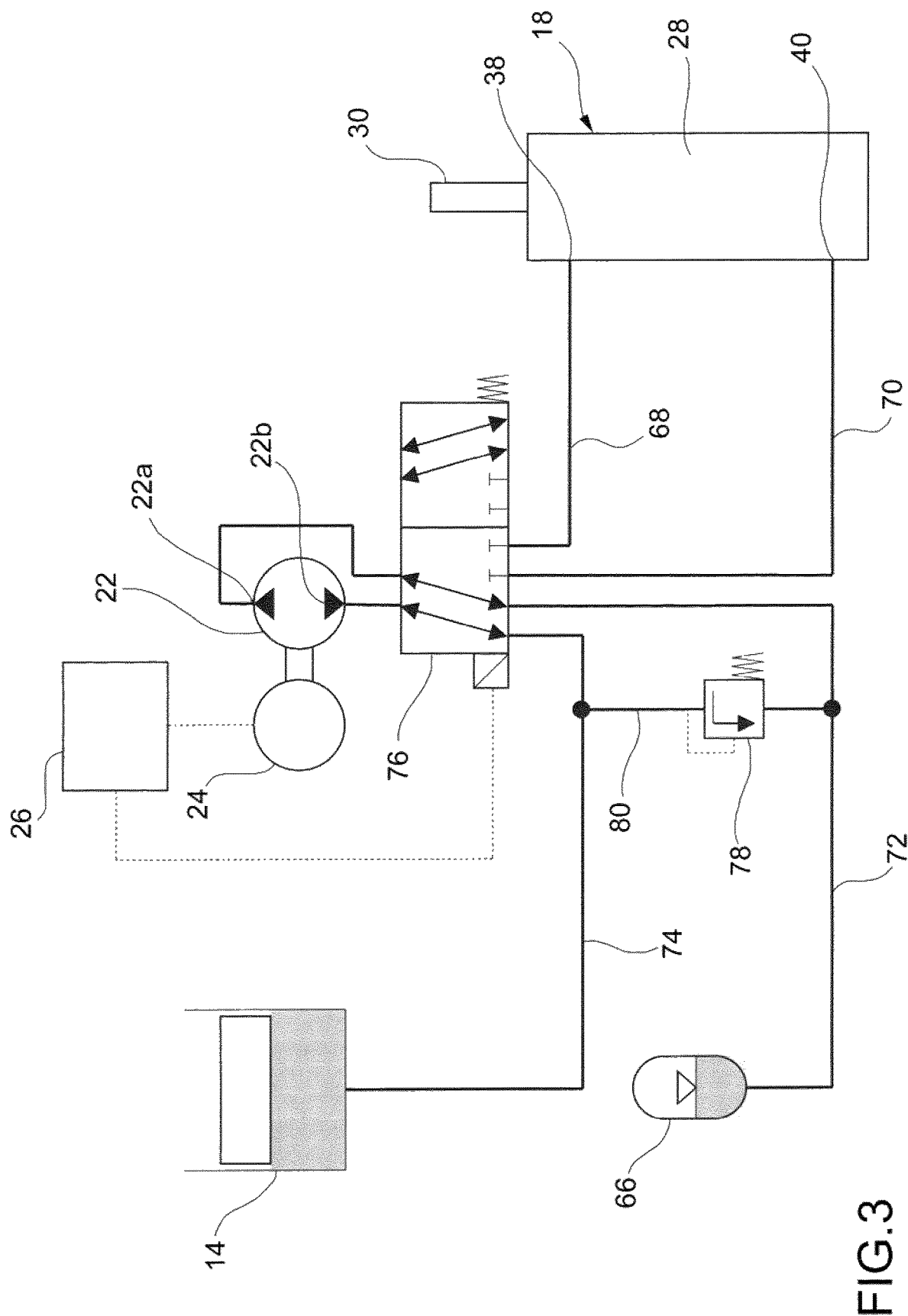
FIG. 3 is a diagram of the hydraulic circuit of FIG. 2, in a second operating mode in which the hydraulic actuator is extended or compressed to increase or reduce, respectively, the distance between the wheel and the body of the vehicle.

As shown in FIGS. 2 and 3, the motor and pump unit 20 comprises a volumetric hydraulic machine 22 (in particular, a reversible hydraulic machine) and an electric machine 24 coupled to the hydraulic machine 22. The hydraulic machine 22 may operate alternatively as a working machine (i.e. as a machine that receives mechanical energy as input and converts such energy into hydraulic energy) or as a motor (i.e. as a machine that receives hydraulic energy as input and converts such energy into mechanical energy). Similarly, the electric machine 24 may operate alternatively as a working machine (i.e. as a machine that receives mechanical energy as input and converts such energy into electrical energy) or as a motor (i.e. as a machine that receives electrical energy as input and converts such energy into mechanical energy). In a manner known per se, a drive shaft of the hydraulic machine 22 is coupled, for example by a joint, to a drive shaft of the electric machine 24. The shock-absorbing unit 16 further comprises, in a manner known per se, an electronic control unit 26 that controls the torque (load or motor torque) of the electric machine 24.

Figure 6:
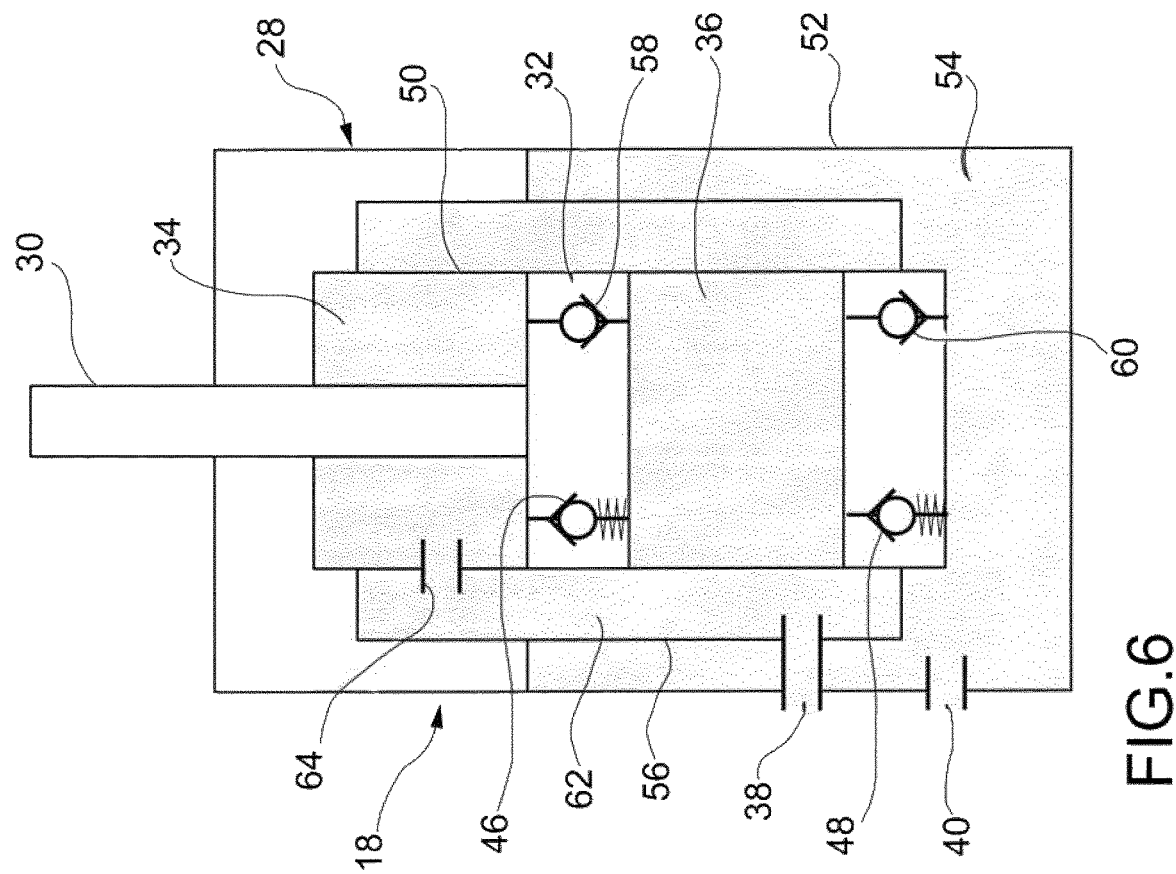
FIG. 6 schematically shows a further example of a hydraulic shock-absorber that may be used in a vehicle wheel suspension according to the present invention.
Figure 5:
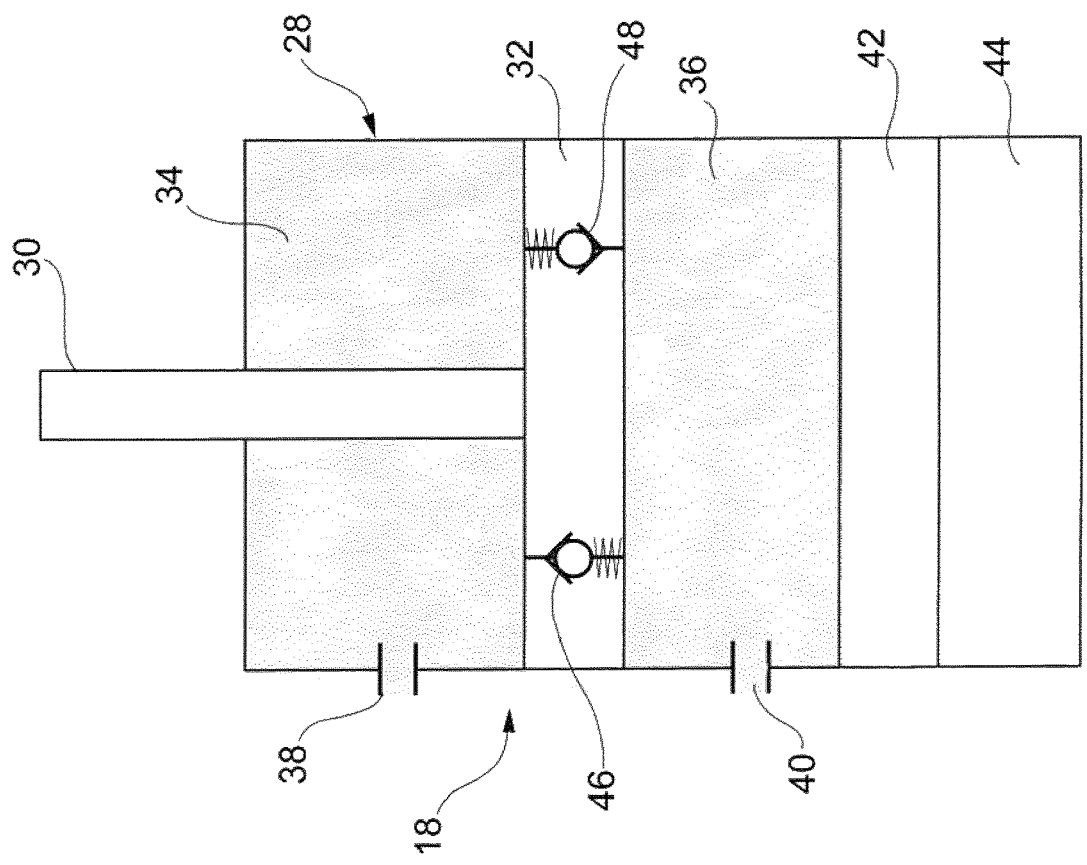
FIG. 5 schematically shows an example of a hydraulic shock-absorber that may be used in a vehicle wheel suspension according to the present invention.

Referring also to FIGS. 5 and 6, which show two embodiments of a shock-absorber that may be used in a suspension according to the present invention, the shock-absorber 18 comprises, in a manner known per se, a cylinder 28, a rod 30 partially projecting from the top of the cylinder 28 and a piston 32 which is slidably arranged inside the cylinder 28 and is rigidly connected to the rod 30. The piston 32 separates an extension chamber 34 arranged on the side of the rod 30 from a compression chamber 36 arranged opposite to the rod 30. A working fluid (oil) is contained in the extension chamber 34 and in the compression chamber 36. The shock-absorber 18 is provided with a first and a second hydraulic communication port, respectively indicated 38 and 40.

In the embodiment of FIG. 5, the shock-absorber 18 is a so-called single-tube shock-absorber, that is, a shock-absorber in which the cylinder 28 is formed by a single tube. In this case, the shock-absorber 18 further comprises, in a manner known per se, a movable diaphragm 42 which is slidably received in the cylinder 28 below the piston 32 and separates the compression chamber 36 from a gas chamber 44 containing high pressure gas (typically at a pressure of 15-20 bar). The shock-absorber 18 further comprises a pair of non-return valves which are mounted in the piston 32 and adjust the oil flow between the extension chamber 34 and the compression chamber 36, namely an extension valve 46, which allows the oil to flow only in the direction from the extension chamber 34 to the compression chamber 36, and a compression valve 48, which allows the oil to flow only in the opposite direction, i.e. from the compression chamber 36 to the extension chamber 34. The first hydraulic communication port 38 communicates with the extension chamber 34, while the second hydraulic communication port 40 communicates with the compression chamber 36.

In the embodiment of FIG. 6, in which parts and elements identical or corresponding to those of FIG. 5 are indicated with the same reference numbers, the shock-absorber 18 is a so-called three-tube shock-absorber. In this case, the cylinder 28 comprises three tubes arranged coaxially to the other, namely:

a first innermost tube 50, in which a piston 32 is slidably arranged so as to split the internal volume of the first tube 50 into an extension chamber 34 and a compression chamber 36;

a second outermost tube 52 which encloses, together with the first tube 50, a reservoir chamber 54, wherein the upper part of this chamber contains pressurized gas while the lower part of this chamber contains oil; and a third intermediate tube 56 interposed between the first tube 50 and the second tube 52.

The extension valve 46 is mounted in the piston 32, as in the case of the single-tube shock-absorber, and allows the oil to flow only in the direction from the extension chamber 34 to the compression chamber 36, while the compression valve 48 is mounted on the bottom of the first tube 50 and allows the oil to flow only in the direction from the compression chamber 36 to the reservoir chamber 54. The shock-absorber 18 comprises two further non-return valves, namely a compensating valve 58, which is mounted in the piston 32 and allows the oil to flow only in the direction from the compression chamber 36 to the extension chamber 34, and a suction valve 60, which is mounted on the bottom of the first tube 50 and allows the oil to flow only in the direction from the reservoir chamber 54 to the compression chamber 36.

In this case, the first hydraulic communication port 38 extends through the second tube 52 and the third tube 56 and communicates with an intermediate chamber 62 of the shock-absorber 18 defined between the first tube 50 and the third tube 56, while the second hydraulic communication port 40 extends through the second tube 52 and communicates with the reservoir chamber 54. The shock-absorber 18 also has a third communication port 64 which extends through the first tube 50 and connects the intermediate chamber 62 with the extension chamber 34.

Referring now again to FIGS. 2 and 3, the suspension further comprises an oil reservoir 66. The reservoir 66, the actuator 14, the shock-absorber 18 and the hydraulic machine 22 are connected to each other by a hydraulic circuit comprising a plurality of hydraulic lines as well as valves for controlling the oil flow between the reservoir 66, the actuator 14, the shock-absorber 18 and the hydraulic machine 22.

The aforementioned plurality of hydraulic lines comprises a first hydraulic line 68 connected to the first hydraulic communication port 38 of the shock-absorber 18, a second hydraulic line 70 connected to the second hydraulic communication port 40 of the shock-absorber 18, a third hydraulic line 72 connected to the reservoir 66 and a fourth hydraulic line 74 connected to the actuator 14.

The aforementioned valves comprise a first flow control valve 76, which in the embodiment of FIGS. 2 and 3 is a 6/2 (6-way and 2-position) valve, adapted to control the connection between the hydraulic lines 68, 70, 72 and 74 and the upper and lower mouths (where the terms "upper" and "lower" refer to the point of view of the observer looking at FIGS. 2 and 3) of the hydraulic machine 22, indicated 22a and 22b, respectively. The first flow control valve 76 is controllable, for example by an electric drive under the control of the electronic control unit 26, to selectively take a first position (FIG. 2) and a second position (FIG. 3).

As shown in FIG. 2, in the first position the first flow control valve 76 puts the upper mouth 22a of the hydraulic machine 22 in communication with the first hydraulic communication port 38 of the shock-absorber 18 through the first hydraulic line 68 and the lower mouth 2b of the hydraulic machine 22 with the second hydraulic communication port 40 of the shock-absorber 18 through the second hydraulic line 70. Furthermore, in the first position the first flow control valve 76 closes the third hydraulic line 72 and the fourth hydraulic line 74, thereby preventing communication between the hydraulic machine 22 and the reservoir 66 and between the hydraulic machine 22 and the actuator 14.

As shown in FIG. 3, in the second position the first flow control valve 76 puts the upper mouth 22a of the hydraulic machine 22 in communication with the reservoir 66 through the third hydraulic line 72 and the lower mouth 22b of the hydraulic machine 22 with the actuator 14 through the fourth hydraulic line 74. Moreover, in the second position the first flow control valve 76 closes the first hydraulic line 68 and the second hydraulic line 70, thereby preventing communication between the hydraulic machine 22 and the shock-absorber 18. Preferably, the first flow control valve 76 is normally kept in the first position (FIG. 2).

Preferably, the aforementioned valves further comprise a pressure relief valve 78 disposed along a fifth hydraulic line 80 that connects the third hydraulic line 72 with the fourth hydraulic line 74. The pressure relief valve 78 allows oil discharge from the fourth hydraulic line 74 to the third hydraulic line 72, i.e. from the actuator 14 to the reservoir 66, in the of increased pressure in the fourth hydraulic line 74 above a given safety value due, for example, to a load peak on the actuator 14 when the first flow control valve 76 is in the first position.

The suspension 10 described above is capable of operating under the following three main operating conditions:

1) actuator 14 in a fixed position to keep the distance between the wheel W and the body B of the vehicle at a constant value;
2) actuator 14 extended (raised) to increase the distance between the wheel W and the body B of the vehicle; and
3) actuator 14 compressed (lowered) to reduce the distance between the wheel W and the body B of the vehicle.

As shown in FIG. 2, the first operating condition (actuator 14 in a fixed position) is obtained with the first flow control valve 76 in the first position (FIG. 2), which, as previously mentioned, is preferably the position where said valve is not excited.

In this position, the fourth hydraulic line 74 is closed and therefore the actuator 14 is locked in its position. Furthermore, the first hydraulic communication port 38 of the shock-absorber 18 communicates through the first hydraulic line 68 with the upper mouth 22a of the hydraulic machine 22, while the second hydraulic communication port 40 of the shock-absorber 18 communicates, through the second hydraulic line 70, with the lower mouth 22b of the hydraulic machine 22.

This means that, in case of a shock-absorber 18 made as a single-tube shock-absorber (such as that of FIG. 5), the upper mouth 22a and the lower mouth 22b of the hydraulic machine 22 are in communication with the extension chamber 34 and with the compression chamber 36 of the shock-absorber, respectively. Therefore, the extension and compression movement of the shock-absorber 18 produces a rotation in one direction and the other of the drive shaft of the hydraulic machine 22, and hence of the drive shaft of the electric machine 24.

On the other hand, in case of a shock-absorber 18 made as a three-tube shock-absorber (such as that of FIG. 6), the upper mouth 22a and the lower mouth 22b of the hydraulic machine 22 are in communication with the intermediate chamber 62 (and hence, through the third communication port 64, with the extension chamber 34) and with the reservoir chamber 54 of the shock-absorber, respectively. In this case, the reciprocating movement of the piston 32 produces an oil flow that is always directed from the extension chamber 34 to the upper mouth 22a of the hydraulic machine 22, through the intermediate chamber 62 and from the lower mouth 22b of the hydraulic machine 22 to the reservoir chamber 54, both during the extension phase and during the compression phase of the shock-absorber 18, and therefore the hydraulic machine 22 and the electric machine 24 always rotate in the same direction.

The shock-absorber 18 thus functions in regenerative mode, that is to say, in a mode such that the hydraulic machine 22 acts as a motor and the electric machine 24 acts as a generator, so as to convert part of the vibrational kinetic energy of the suspension into electrical energy. The damping level of the shock-absorber 18 is controlled in real time by control of the load torque of the electric machine 24 by the electronic control unit 26.

The second operating condition (actuator 14 raised to increase the height of the vehicle from the ground) is obtained with the first flow control valve 76 in the second position (FIG. 3), which, as previously stated, is preferably the position where this valve is excited. In this position, the shock-absorber 18 is isolated from the hydraulic machine 22, the first and second hydraulic lines 68 and 70 being closed, while the upper mouth 22a and lower mouth 22b of the hydraulic machine 22 are connected respectively to the reservoir 66 through the third hydraulic line 72 and to the actuator 14 through the fourth hydraulic line 74. By powering the electric machine 24 (operating in this case as a motor) under control of the electronic control unit 26, the hydraulic machine 22 operates as a pump, drawing oil from the reservoir 66 and supplying pressurized oil to the actuator 14.

In this operating condition, the maximum working pressure of the hydraulic machine 22 is limited by current control of the electric machine 24 by the electronic control unit 26. The pressure relief valve 78, if present, limits the maximum pressure within the actuator 14, thus ensuring the correct operation of all sealing elements of the actuator itself. In addition, the pressure relief valve 78 acts as a further hardware security against any overpressure in the fourth hydraulic line 74 which supplies the actuator 14 and against any overcurrent in the electric machine 24, which may for example occur in case of malfunction of the electric machine 24 or of the electronic control unit 26.

During the raising stage of the actuator 14, the shock-absorber 18 is, as mentioned above, completely hydraulically isolated from the hydraulic machine 22, so that the oil may only flow within the shock-absorber 18 through the passive valves present in the shock-absorber itself, that is, the extension valve 46 and the compression valve 48, as well as—in the case of a three-tube shock-absorber—through the compensation valve 58 and the suction valve 60. In this condition, the shock-absorber 18 ensures the maximum level of damping of its adjustment range and therefore slows the extension movement of the suspension (i.e. the lifting motion of the vehicle) to a greater extent the greater the damping level.

To ensure high hydraulic efficiency during the regenerative operation of the shock-absorber 18, the extension valve 46 and the compression valve 48 must behave as maximum pressure valves, thus ensuring a perfect oil seal until the pressure upstream of these valves reaches a predetermined value, which is usually a high value to ensure a maximum damping value. The preload pressure value of the extension valve 46 might be, for example, as high as to not allow the extension of the shock-absorber 18 during the lifting stage of the actuator 14. In this condition, however, while pumping oil into actuator 14 via the hydraulic machine 22, the suspension would not extend, i.e. the distance between the body B and the wheel W of the vehicle would not increase, but rather the only effect would be to compress the spring 12 as a result of the extension of the actuator 14. This situation is purely ideal, since in reality it is not possible to guarantee the perfect seal of the valves of the shock-absorber, but it must be taken into account as it represents the limit case of a shock-absorber with a particularly rigid setting of the passive valves, i.e. of an overdamped shock-absorber. Even in this ideal case, however, it is possible to extend the shock-absorber according to one of the following two strategies.

According to a first strategy, the extension of the shock-absorber occurs in two successive stages. In a first stage, the first flow control valve 76 is in the second position and the oil pumped by the hydraulic machine 22 acting as a pump causes extension of the actuator 14. Due to infinitely rigid setting of the shock-absorber 18, the distance between the body B and the wheel W of the vehicle remains unchanged, so the extension of the actuator 14 corresponds to a compression of the spring 12 by the same amount. In a second stage, the first flow control valve 76 is brought back to the first position and the electric machine 24 is controlled so as not to transmit motor torque to the hydraulic machine 22 anymore, but to transmit only a load torque that can be adjusted by the electronic control unit 26. In this way, the shock-absorber 18 operates in regenerative mode with a properly set damping level, and since the spring 12 had been compressed in the preceding stage, the suspension at this point extends with a stroke equal to that previously made by the actuator 14 and at a speed which only depends on the damping level of the shock-absorber 18 set by the electronic control unit 26. For example, if the damping is set very low, lower than the critical damping of the suspension, the suspension will extend very quickly and with a considerable over-elongation, and then will oscillate around the final extension value before damping completely. On the other hand, if the damping is set very high, higher than the critical damping of the suspension, the suspension will extend more slowly and without over-elongation, tending towards the final extension value without oscillating around it.

If the actuator 14 has to be raised with the vehicle in motion, one should avoid leaving the suspension locked for a period of time long enough to be perceived by the vehicle's passengers, which occurs in the first stage described above. To limit as much as possible the occupants' perception of this locking phase of the suspension, it is preferable to extend the suspension by repeating more than once the two stages described above until reaching the desired final extension. This solution has the advantage that each first stage in which the suspension is locked may last such a short time that it may not be perceived by the occupants, whereas in all the second stages of the suspension extension the shock-absorber 18 operates in regenerative mode and the damping level may be set with the aim of ensuring maximum comfort and driving feeling.

Figure 8:
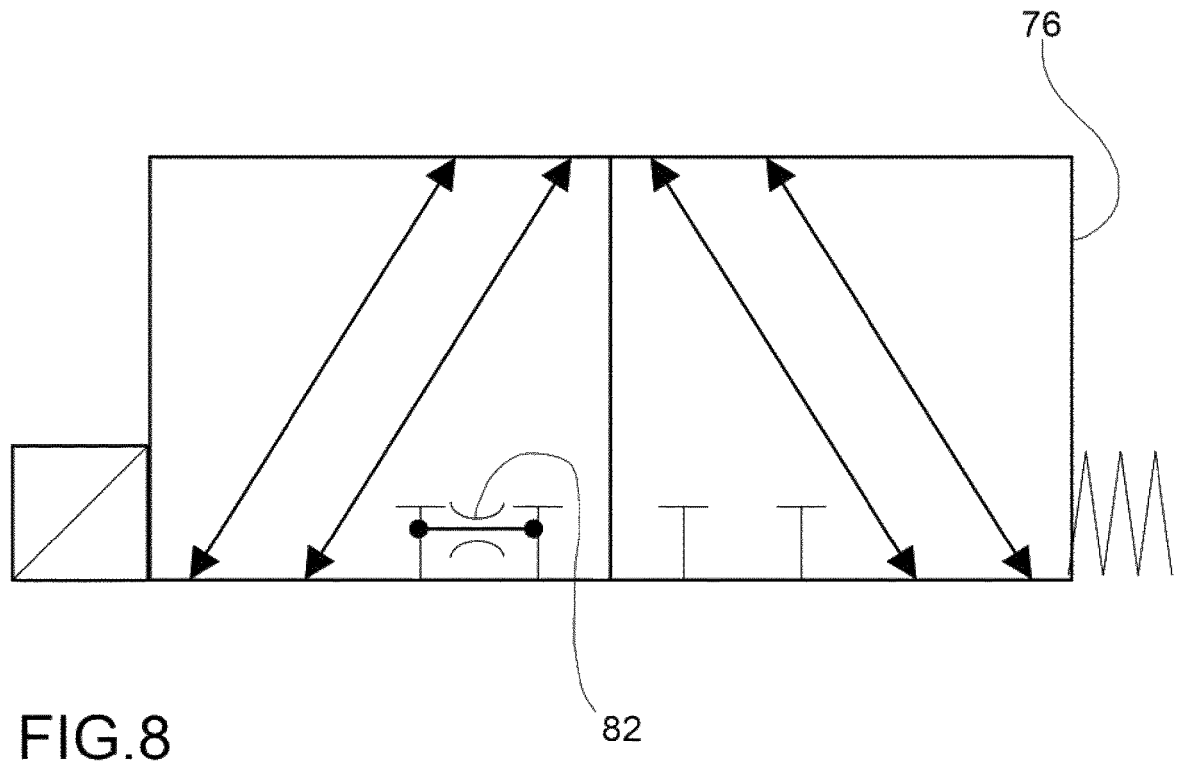
FIGS. 8 and 9 schematically show two different examples of a flow control valve that may be used in the hydraulic circuit of a vehicle wheel suspension according to the present invention.

As an alternative to the first strategy described above, a modified version of the first flow control valve 76 may be used, as shown in FIG. 8. With respect to what is shown in FIG. 3, the first flow control valve 76 further comprises a bypass calibrated restrictor 82, which in the position of the valve connects the port of the valve connected to the first hydraulic line 68, and therefore to the first hydraulic communication port 38 of the shock-absorber 18, and the port of the valve connected to the second hydraulic line 70, and therefore to the second hydraulic communication port 40 of the shock-absorber 18. An oil passage is thus obtained, with an adjustable flow rate-pressure characteristic, between the two aforementioned ports of the first flow control valve 76, which allows the shock-absorber 18, and therefore also the assembly formed by the spring 12 and the actuator 14, to be extended. In this way, extension of the suspension may be carried out in a single step, with an extension speed determined by the diameter of the restrictor 82, as well as by the current control of the electric machine 24.

The third operating condition of the suspension, in which the actuator 14 is retracted to reduce the height of the vehicle from the ground, is also obtained, like the second operating condition described above, with the first flow control valve 76 in the second position of FIG. 3. In this case, the oil flows from the actuator 14 to the reservoir 66 in the opposite direction with respect to the second operating condition. The hydraulic machine 22 operates as a motor and provides torque to the electric machine 24 operating as a generator. The hydraulic resistance level of the hydraulic machine 22 may be controlled in real time by controlling the load torque of the electric machine 24 through the electronic control unit 26.

Likewise, during the lowering stage of the actuator 14, the preload pressure value of the compression valve 48 might be so high that it would not allow compression of the shock-absorber 18. In this condition, therefore, despite the drainage of the actuator 14 due to the fact that the oil may flow to the reservoir 66 through the hydraulic machine 22, the suspension would not compress, i.e. the distance between the body B and the wheel W of the vehicle would not decrease; the only effect would be to extend the spring 12 following the compression of the actuator 14. The height of the vehicle from the ground may be reduced using the two different strategies described above with reference to the second operating condition, i.e. by one or more displacement cycles in each of which the first flow control valve is first brought to the second position to control the movement of the actuator 14 (in this case the compression movement) and then brought to the first position to allow the shock-absorber 18, and hence also the body of the vehicle, to follow the movement just effected by the actuator 14, or by using a first flow control valve 76 such as that of FIG. 8, i.e. a first flow control valve provided with the bypass calibrated restrictor 82.

Figure 4:
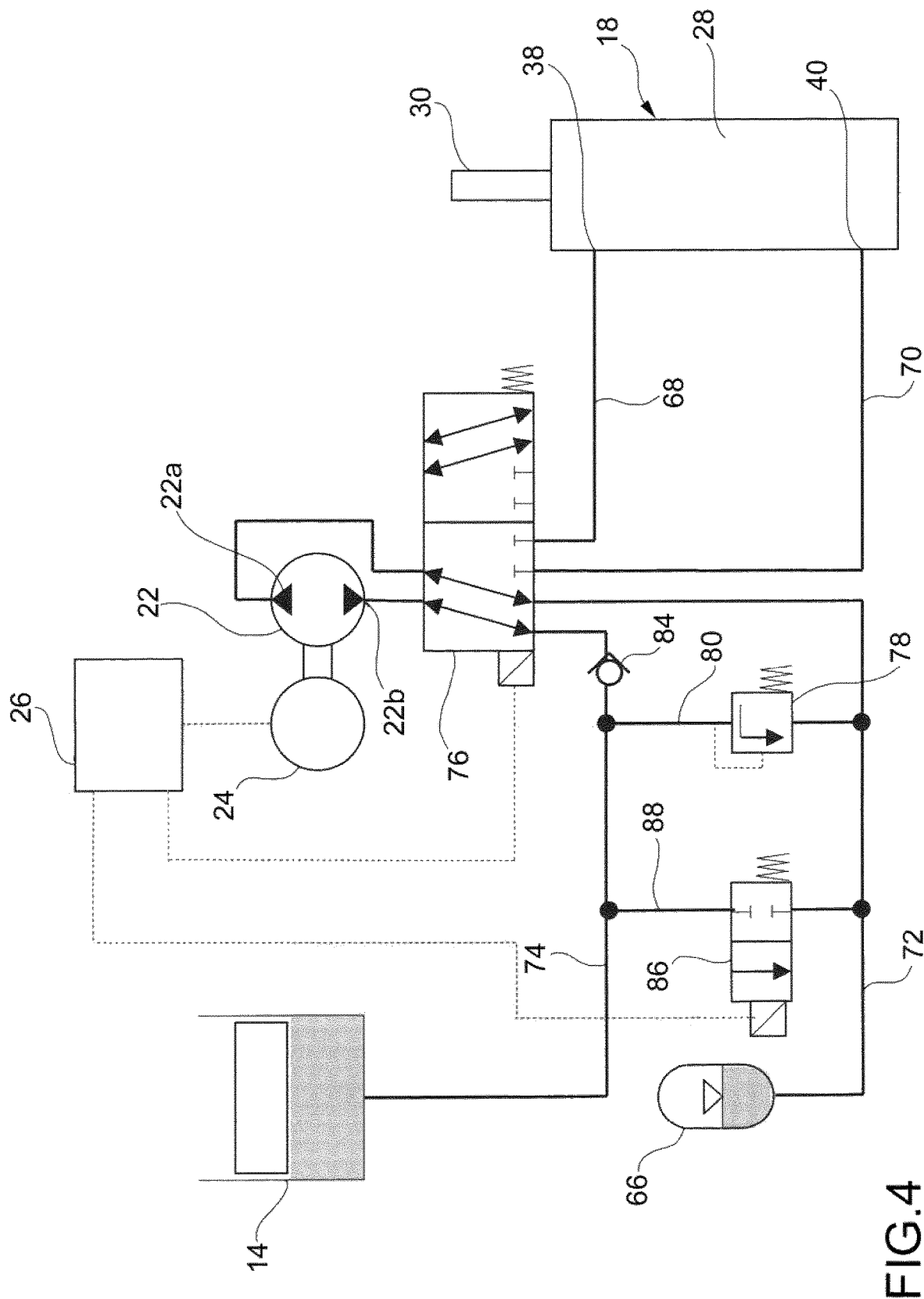
FIG. 4 is a diagram of a further embodiment of a hydraulic circuit for a vehicle wheel suspension according to the present invention.

According to the embodiment of FIG. 4, the valves of the hydraulic circuit of the suspension further comprise a non-return valve 84 which is arranged along the fourth hydraulic line 74, specifically between the first flow control valve 76 and the connecting point between the fourth hydraulic line 74 and the fifth hydraulic line 80, and is adapted to allow the oil to flow only in the direction from the hydraulic machine 22 to the actuator 14 when the first flow control valve 76 is in the second position. In this case, in order to allow the oil to flow from the actuator 14 to the reservoir 66 when the actuator 14 is to be retracted, the valves of the hydraulic circuit of the suspension further comprise a second flow control valve 86 adapted to control the connection between the third hydraulic line 72 and the fourth hydraulic line 74 (and hence between the actuator 14 and the reservoir 66) through a sixth hydraulic line 88 which is connected to the fourth hydraulic line 74 at a point interposed between the actuator 14 and the non-return valve 84. The second flow control valve 86 is controllable (for example by an electric drive under control of the electronic control unit 26) to selectively take a first position, in which it prevents the oil from flowing through the sixth hydraulic line 88, and therefore isolates the actuator 14 from the reservoir 66, and a second position, in which it allows the oil to flow through the sixth hydraulic line 88 from the actuator 14 to the reservoir 66. Preferably, the second flow control valve 76 is normally kept in the first position. Preferably, the second flow control valve 86 is a 2/2 valve, i.e. a two-way two-position valve.

Figure 7:
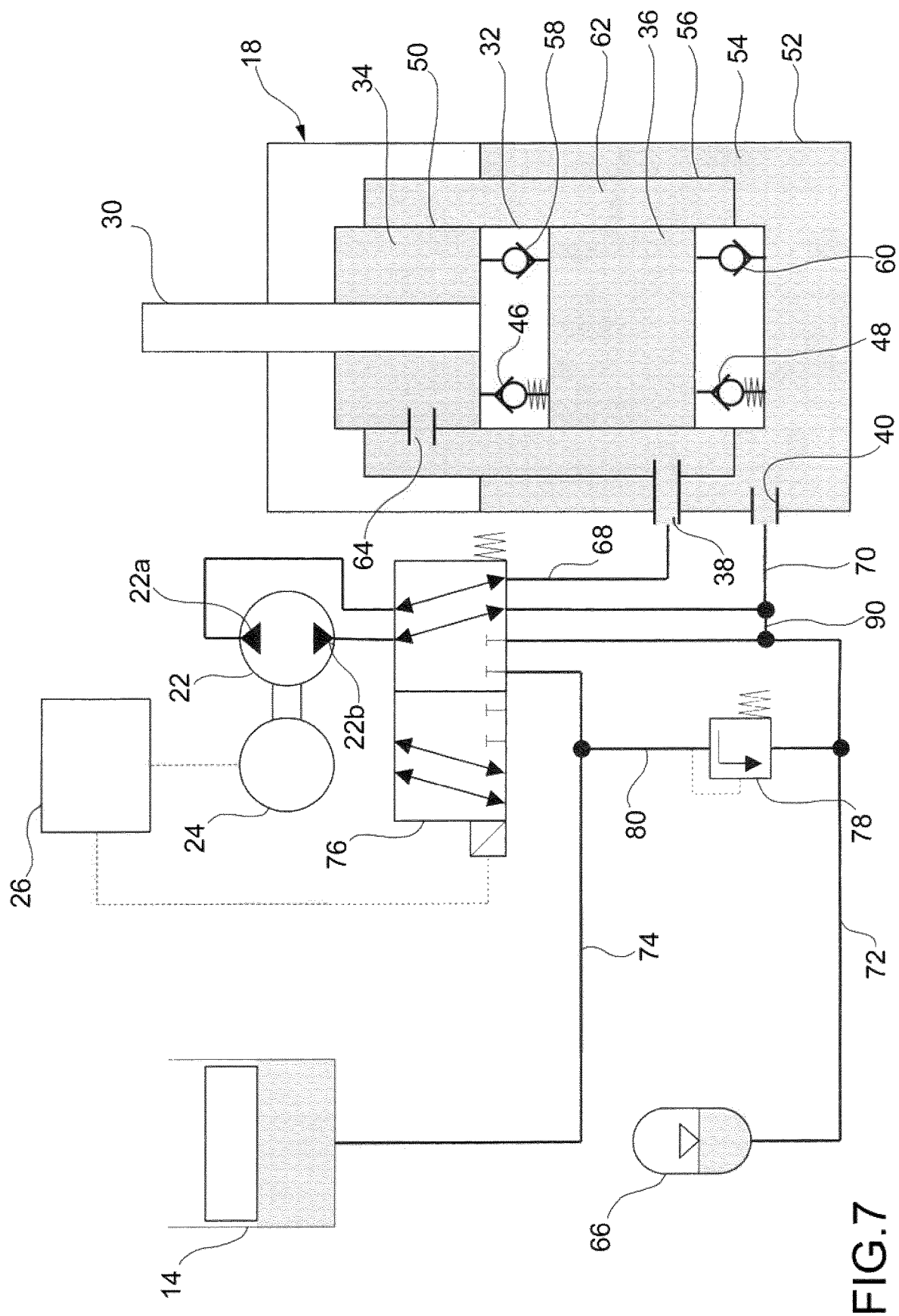
FIG. 7 is a diagram of a further embodiment of a hydraulic circuit for a vehicle wheel suspension according to the present invention, using a hydraulic shock-absorber according to FIG. 6.

With reference finally to FIG. 7, in case the hydraulic shock-absorber 18 is a three-tube shock-absorber, such as the one shown in FIG. 6, the second hydraulic line 70, which communicates with the reservoir chamber 54 of the shock-absorber 18 through the second hydraulic communication port 40, and the third hydraulic line 72, which communicates with the reservoir 66, may be connected to each other through a bypass line indicated 90, as shown schematically in FIG. 7. The reservoir 66 is thus always in communication with the reservoir chamber 54 of the shock-absorber 18 and is therefore at the same low pressure (typically from 2 to 6 bar) as this chamber.

In this case, the reservoir 66 may also be omitted, the function of the reservoir being carried out only by the reservoir chamber 54 of the shock-absorber. However, it is preferable to include the reservoir 66 also, so as to make it possible to have an oil reserve from which to draw oil to be fed into the actuator 14 when the first flow control valve 76 is in the second position, in case the amount of oil present in the reservoir chamber 54 of the shock-absorber 18 is not sufficient to ensure the required travel of the actuator 14.

Figure 9:
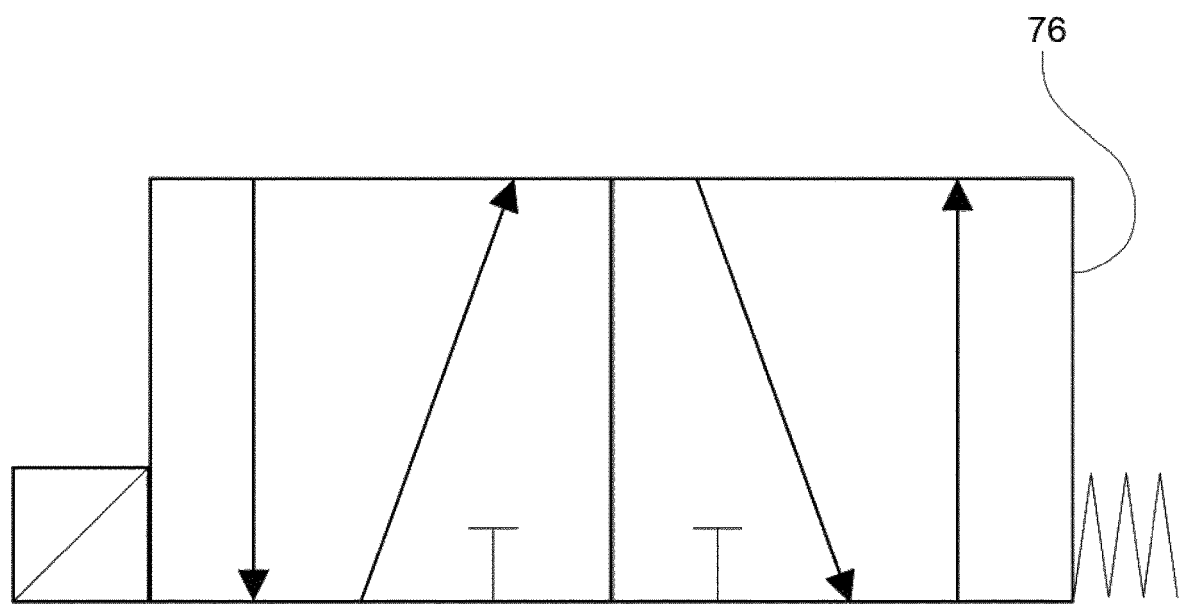

In case of use of a shock-absorber 18 made as a three-tube shock-absorber, the first flow control valve 76 may be modified as shown in FIG. 9, i.e. may have five paths instead of six. In this case, the end sections (valve side ends) of the second hydraulic line 70 and of the third hydraulic line 72 may lead to a single section connected to the first flow control valve 76 via a single path.

As will be apparent from the above description, a suspension according to the present invention offers, among others, the following advantages:

it allows to perform both the energy regeneration function with control of the damping of the shock-absorber and the vehicle attitude control function, by using for both of these functions a common mechanical, hydraulic, electrical and electronic hardware, thus minimizing the level of complexity of the suspension;

it does not require a complex hydraulic circuit on board of the vehicle, as is the case with conventional vehicle lift systems that use a single pump to supply more actuators distributed over more suspensions of the vehicle, since the actuator 14 is mounted on the same suspension;

when it is associated with each "corner" of the vehicle, the suspension allows different heights from the ground to be set for the various corners, as each corner is hydraulically isolated from all the others; and in the case of a hydraulic shock-absorber made as a three-tube shock-absorber, it allows the use of a simpler and more reliable hydraulic machine, as this machine always rotates in the same direction.

Naturally, the principle of the invention remaining unchanged, the embodiments and constructional details may be greatly varied with respect to those described and illustrated here purely by way of a non-limiting example, without thereby departing from the scope of the invention as defined in the accompanying claims.

The invention claimed is:

1. A suspension for a wheel (W) of a vehicle, comprising a spring interposed between a body (B) of the vehicle and the wheel (W), and a regenerative hydraulic shock-absorbing unit comprising a hydraulic shock-absorber arranged in parallel with the spring, a motor and pump unit with a volumetric hydraulic machine and an electric machine coupled to the hydraulic machine, wherein both the hydraulic machine and the electric machine operate alternatively as a working machine or as a motor, and an electronic control unit arranged to control a torque of the electric machine, whereby the regenerative hydraulic shock-absorbing unit is able to convert part of a vibrational kinetic energy of the suspension into electric energy, wherein the suspension further comprises a single-effect hydraulic actuator arranged in series with the spring to control a vertical position of the body (B) relative to the wheel (W), a reservoir, and a hydraulic circuit connecting the hydraulic shock-absorber, the hydraulic machine, the hydraulic actuator and the reservoir with each other, the hydraulic circuit comprising a valve assembly for controlling the flow of a working fluid between the hydraulic shock-absorber, the hydraulic machine, the hydraulic actuator and the reservoir so as to enable the suspension to operate selectively in one of the following operating conditions:

a first operating condition, in which the hydraulic actuator is isolated from the reservoir and remains therefore in a fixed position, thereby keeping a distance between the wheel (W) and the body (B) of the vehicle unchanged, and in which the hydraulic shock-absorber is connected to the hydraulic machine to enable the regenerative hydraulic shock-absorbing unit to operate in regenerative mode, that is to say, to convert part of the vibrational kinetic energy of the suspension into electric energy;

a second operating condition, in which the hydraulic actuator is connected to, and supplied by, the hydraulic machine to be extended and thus increase the distance between the wheel (W) and the body (B) of the vehicle, and in which the hydraulic shock-absorber is isolated from the hydraulic machine; and a third operating condition, in which the hydraulic actuator is connected to the reservoir to be retracted and thus reduce the distance between the wheel (W) and the body (B) of the vehicle, and in which the hydraulic shock-absorber is isolated from the hydraulic machine.

2. The suspension of claim 1, wherein the hydraulic circuit further comprises a first hydraulic line connected to a first hydraulic communication port of the hydraulic shock-absorber, a second hydraulic line connected to a second hydraulic communication port of the hydraulic shock-absorber, a third hydraulic line connected to the reservoir, and a fourth hydraulic line connected to the hydraulic actuator, and wherein said valve assembly comprises a first flow control valve for controlling the connection of said first, second, third and fourth hydraulic lines with an upper mouth and a lower mouth of the hydraulic machine.

3. The suspension of claim 2, wherein the first flow control valve is controllable to take selectively a first position, where it puts the upper mouth and the lower mouth of the hydraulic machine in communication with the first and second hydraulic communication ports of the hydraulic shock-absorber, respectively, and closes the third and fourth hydraulic lines, and a second position, where it puts the upper mouth and the lower mouth of the hydraulic machine in communication with the third and fourth hydraulic lines, respectively, and closes the first and second hydraulic lines.

4. The suspension of claim 3, wherein the first flow control valve is normally kept in the first position.

5. The suspension of claim 3, wherein the first flow control valve includes a bypass calibrated restrictor which in the second position puts the first and second hydraulic lines in communication with each other.

6. The suspension of claim 2, wherein said valve assembly further comprises a pressure relief valve arranged along a fifth hydraulic line connecting the third hydraulic line with the fourth hydraulic line to allow the working fluid to be discharged from the actuator to the reservoir if a pressure in the fourth hydraulic line exceeds a given safety value.

7. The suspension of claim 2, wherein said valve assembly further comprises:
a non-return valve which is arranged along the fourth hydraulic line and is able to allow the working fluid to flow only in a direction from the hydraulic machine to the actuator, when the first flow control valve is in the second position, and
a second flow control valve for controlling the connection between the third hydraulic line and the fourth hydraulic line through a sixth hydraulic line which is connected to the fourth hydraulic line in a point between the actuator and the non-return valve.

8. The suspension of claim 7, wherein the second flow control valve is a two-way two-position valve which is normally kept in a position in which the second flow control valve prevents the working fluid from flowing through the sixth hydraulic line.

9. The suspension of claim 2, wherein the hydraulic shock-absorber is a single-tube shock-absorber comprising a cylinder and a piston slidably arranged in the cylinder so as to separate an extension chamber and a compression chamber from each other, wherein the piston is provided with a first non-return valve and a second non-return valve which control the flow of the working fluid between the extension chamber and the compression chamber, the first non-return valve allowing the working fluid to flow only in a direction from the extension chamber to the compression chamber and the second non-return valve allowing the working fluid to flow only in a direction from the compression chamber to the extension chamber, wherein the cylinder slidably receives a movable diaphragm which is placed underneath the piston and separates the compression chamber from a gas chamber containing gas at high pressure, and wherein the first and second hydraulic communication ports of the hydraulic shock-absorber are connected with the extension chamber and the compression chamber, respectively.

10. The suspension of claim 2, wherein the hydraulic shock-absorber is a three-tube shock-absorber comprising:
a first innermost tube, in which a piston is slidably arranged so as to split the internal volume of the said first tube into an extension chamber and a compression chamber,
a second outermost tube, which is arranged coaxially with the first tube so as to define with the first tube a reservoir chamber,
a third tube which is interposed between the first tube and the second tube, coaxially therewith, and encloses with the first tube an intermediate chamber, wherein the first and second hydraulic communication ports of the hydraulic shock-absorber are connected with the intermediate chamber and the reservoir chamber, respectively, and
wherein the hydraulic shock-absorber is also provided with a third communication port through which the intermediate chamber communicates with the extension chamber.

11. The suspension of claim 10, wherein the reservoir is formed by the reservoir chamber of the hydraulic shock-absorber only and wherein the third hydraulic line coincides with the second hydraulic line.

12. The suspension of claim 10, wherein the reservoir comprises the reservoir chamber of the hydraulic shock-absorber and an additional reservoir separate from the reservoir chamber, and wherein the third hydraulic line is connected both to the additional reservoir and to the second hydraulic line.

13. The suspension of claim 10, wherein the piston of the hydraulic shock-absorber is provided with a first non-return valve and a second non-return valve which control flow of the working fluid between the extension chamber and the compression chamber, the first non-return valve allowing the working fluid to flow only in a direction from the extension chamber to the compression chamber and the second non-return valve allowing the working fluid to flow only in a direction from the compression chamber to the extension chamber, wherein the first tube is provided with a third non-return valve and a fourth non-return valve which control the flow of the working fluid between the compression chamber and the reservoir chamber, the third non-return valve allowing the working fluid to flow only in a direction from the compression chamber to the reservoir chamber and the fourth non-return valve allowing the working fluid to flow only in a direction from the reservoir chamber to the compression chamber, wherein the first non-return valve is arranged to open in case of a pressure difference between the extension chamber and the compression chamber larger than a pressure difference at which the second non-return valve is designed to open, and wherein the third non-return valve is arranged to open in case of a pressure difference between the compression chamber and the reservoir chamber larger than a pressure difference at which the fourth non-return valve is designed to open.

14. A method for controlling a height to ground of a vehicle provided with a suspension according to claim 1, comprising, in cyclic succession until a desired height to ground is reached, the steps of:

a) causing extension or retraction of the hydraulic actuator by putting the hydraulic actuator in communication with the reservoir through the hydraulic machine and disconnecting the hydraulic shock-absorber from the hydraulic machine; and
b) disconnecting the hydraulic actuator from the hydraulic machine and connecting the hydraulic shock-absorber to the hydraulic machine so as to allow the hydraulic shock-absorber to extend or retract under an action of the spring.

* * * * *

UNITED STATES PATENT AND TRADEMARK OFFICE
CERTIFICATE OF CORRECTION

PATENT NO. : 11,072,220 B2  
APPLICATION NO. : 16/303518  
DATED : July 27, 2021  
INVENTOR(S) : Conti et al.

It is certified that error appears in the above-identified patent and that said Letters Patent is hereby corrected as shown below:

In the Claims

Column 12, Lines 10-11 (Claim 10) delete "the said first tube" and insert therefor --said first tube--.

Signed and Sealed this
Twenty-first Day of June, 2022

Katherine Kelly Vidal
*Director of the United States Patent and Trademark Office*